Patented Feb. 16, 1943

2,310,961

UNITED STATES PATENT OFFICE 2,310,961

COPOLYMER OF ISOPROPENYL TOLUENE AND ACRYLONITRILE AND PROCESS OF PRODUCING SAME

Edward L. Kropa, Old Greenwich, Conn., assignor to American Cyanamid Company, New York, N. Y., a corporation of Maine No Drawing. Application May 3, 1941, Serial No. 391,712

10 Claims. (Cl. 260—17)

This invention relates to copolymers of isopropenyl toluene and acrylonitrile and processes of producing the same.

Isopropenyl toluene unlike other unsaturated materials does not itself polymerize readily and extremely active catalysts or very high temperatures are generally required to effect polymerization of this substance. Under these conditions low molecular weight polymers are obtained.

An object of this invention is to prepare polymeric materials from isopropenyl toluene.

Another object of this invention is to prepare polymeric materials of high molecular weight.

Another object of this invention is to activate the polymerization of isopropenyl toluene. More specifically it is an object of this invention to activate the polymerization of isopropenyl toluene by means of another polymerizable compound so that it forms an inseparable part of the ultimate product.

Still another object of this invention is to provide processes for the polymerization of isopropenyl toluene with vinyl compounds such as acrylonitrile.

These and other objects are attained by polymerizing mixtures of isopropenyl toluene with acrylonitrile by heating mixtures thereof as such or mixtures thereof in solution, in emulsion, in dispersions, in various combinations of these, etc.

The following examples in which the proportions are in parts by weight are given by way of illustration and not in limitation.

*Example 1*

|  | Parts |
|---|---|
| Isopropenyl toluene (91% pure) | 1284 |
| Acrylonitrile | 630 |

This mixture is equivalent to a 65:35 weight ratio of isopropenyl toluene to acrylonitrile based on materials of 100% purity. The mixture is charged into a suitable reaction vessel which is heated by any suitable means such as steam and which is equipped with a reflux condenser as well as an agitator. A stream of inert gas such as nitrogen or carbon dioxide is passed continuously into the vessel during the reaction, thereby blanketing the surface of the reactants and thus minimizing oxidation and discoloration. The mixture is heated to about 91° C. and then refluxed for about 22 hours at which time the temperature has risen to about 95° C. and the partially polymerized resin is quite viscous. The viscous resinous material may be cast directly and optionally any unreacted monomeric material or low molecular weight polymers may be removed and the highly polymerized material utilized in any desired manner. Two other optional procedures are available. (1) The refluxing may be continued in order to further polymerize the mixture for an additional 48 hours or more and (2) about 1800 parts of ethylene dichloride or other amounts of solvent material are added gradually, thereby avoiding extremely viscous mixtures which are encountered if no solvent is employed and the resulting mixture is heated under reflux for about 48 hours or more. The polymer produced by either method is then suitable for use as a coating composition or upon removal of the solvent material from the product of procedure (2), as a casting composition. If the reaction is not carried sufficiently far to completely polymerize all of the ingredients the low polymers or unreacted substances may be removed by any suitable means as, for example, by steam distillation.

*Example 2*

|  | Parts |
|---|---|
| Acrylonitrile | 450 |
| Isopropenyl toluene | 150 |
| Benzoyl peroxide | 1.2 |
| Emulsifier solution | 400 |
| Water | 1200 |

Any suitable emulsifier solution may be used in this example, the particular one used being prepared by adding 25 parts of the sodium salt of the dioctyl ester of sulfosuccinic acid and 10 parts of sulfonated castor oil to 100 parts of water.

The tabulated substances are charged into a reaction vessel equipped with a reflux condenser and an agitator. The vessel is heated as, for example, by means of a steam bath for about 14 hours, the temperature being maintained at 70–72° C. The mixture is then steam distilled to eliminate any unreacted monomeric substances or low polymers such as dimers and approximately 237 parts of such substances are recovered. Most of the polymer coagulates as a soft white rubbery mass. This may be washed with water and then soaked in hot ethanol for several hours. After drying, about 200 parts of a tough white horn-like polymeric material is obtained.

There is also some additional polymeric material which is in a rather highly dispersed state in the emulsion. This dispersed polymer may be precipitated by slowly adding dilute aluminum chloride solution (5%) with rapid agitation. The precipitated polymer is filtered off from the solution, washed with water, then with ethanol and dried. About 60 parts of a fine powdery material is obtained.

Polymeric materials produced according to this example are especially suitable for use in the production of moldings.

*Example 3*

| | Parts |
|---|---|
| Isopropenyl toluene | 260 |
| Acrylonitrile | 140 |
| An aqueous solution containing 5% of polyvinyl alcohol | 24 |
| Water | 1172 |

These substances are charged into a suitable reaction vessel provided with a reflux condenser and an agitator. The mixture is heated by means of a steam bath under reflux for about 24 hours, the agitator revolving at about 200 R. P. M. A resinous mass separates and rises to the surface as a viscous thick syrup. The rate of speed of the agitator is increased to about 270 R. P. M. and the mass then breaks up and remains suspended. The stirring is then continued for about 5 days during which time the mixture is maintained at about the reflux point. Any unreacted material is removed by distillation followed by steam distillation and washing with water. The product which is now in the form of pellets which are roughly large spheres may be suspended in warm water for a few days to assist in the removal of slight traces of hydrocarbon impurities and vacuum dried. A polymer is thus obtained having a softening point of 120.5° C. (A. S. T. M.). This polymer may be molded under a pressure of about 3000 pounds per square inch at around 155° C. to produce clear, water-white moldings. Such a product is particularly suitable for injection molding. The product being spherical flows very readily without channelling in the feed hopper of the injection molding machine.

*Example 4*

| | Parts |
|---|---|
| Isopropenyl toluene | 260 |
| Acrylonitrile (filtered through bauxite) | 140 |
| An aqueous solution of medium viscosity polyvinyl alcohol | 24 |
| Water | 1172 |
| Oil scarlet dye | 0.04 |

This mixture is placed in a suitable reaction vessel such as that described in the preceding example and refluxed for approximately 168 hours. Small spheres of polymeric materials are formed during this time. The mixture is subjected to steam distillation to remove any unreacted isopropenyl toluene and acrylonitrile. The polymeric material is filtered off from the liquid and suspended in water, at 65° C. for one week in order to remove traces of unreacted materials, soluble impurities, etc. The product is filtered off from the water, dried at 60° C., thereby producing clear, red spheres of polymer varying in size from about 3 to 6 mm. in diameter. This polymeric material may be molded readily under heat and pressure to form clear red tinted molded objects.

*Example 5*

| | Parts |
|---|---|
| Isopropenyl toluene | 260 |
| Acrylonitrile | 234 |
| A 1% aqueous solution of low viscosity methyl cellulose | 1185 |

A 2% aqueous solution of the low viscosity methyl cellulose used in this and the following examples has a viscosity of 25 centipoises.

This mixture is charged into a reaction vessel such as that used above and maintained at the reflux point, i. e., approximately 78–80° C. for about 70 hours. During this time a grainy polymerized product precipitates. The reaction mixture is steam distilled to remove unreacted ingredients, filtered and the polymeric material washed with water to remove the dispersing agent. Polymeric material thus produced contains about 38% of combined acrylonitrile and may be molded under pressures of about 3000 pounds per square inch at temperatures above about 160° C. to produce pale yellow, translucent moldings.

*Example 6*

| | Parts |
|---|---|
| Isopropenyl toluene | 364 |
| Acrylonitrile (bauxite treated) | 176 |
| A 1% aqueous solution of low viscosity methyl cellulose | 1040 |

These substances are heated under reflux for about a week with agitation in a reaction vessel such as that described in the above examples. The product is steam distilled, washed with water, filtered and the solid material dried to form a product suitable for molding under heat and pressure.

*Example 7*

A mixture of isopropenyl toluene and acrylonitrile such as that utilized in Example 6 or a partially polymerized product formed according to the process of Example 1 is added to a 1% aqueous solution of low viscosity methyl cellulose slowly, preferably dropwise and with agitation. Under these conditions the polymerization reaction takes place much more rapidly than according to the process of Example 6 and the same degree of polymerization may be obtained in approximately half of the time otherwise required.

*Example 8*

| | Parts |
|---|---|
| Isopropenyl toluene | 150 |
| Acrylic acid | 10 |
| Acrylonitrile | 50 |

This mixture is placed in a suitable reaction vessel such as that described in the above examples and heated at about 80° C. for 24 hours during which time the mixture turns to a viscous pale yellow solution. About 210 parts of ethylene dichloride are gradually added to this mixture and the heating is continued for an additional 48 hours. The product thus obtained may be cut with ethylene dichloride or other suitable solvent to a solid content of about 25% in order that it may be easily used as a coating composition. This material has better adhesion than the polymers of isopropenyl toluene and acrylonitrile alone since the acrylic acid causes the resinous material to adhere more strongly to the metal than does the product not containing any acid groups.

Other polymerizable reactive acids may be used in the same general manner as the acrylic acid, e. g., maleic acid, alpha-methacrylic acid, itaconic acid, aconitic acid, etc.

*Example 9*

| | Parts |
|---|---|
| Acrylonitrile | 53 |
| Isopropenyl toluene | 53 |
| Acetic anhydride | 80 |
| Pyridine | 0.1–0.5 |

These substances may be reacted all together in the same general manner set forth in the preceding examples or the acrylonitrile and isopropenyl toluene may be partially or completely reacted in the aforesaid manner and the acetic anhydride added, the reaction being continued until the acetylation is complete. The polymeric material is recovered from the reaction mixture as previously described. Molded products produced according to this method have better impact strength than those produced from polymers which are not acetylated or similarly treated.

Any of the other acid anhydrides may be used for acylating acrylonitrile-isopropenyl toluene polymers, e. g., propionic anhydride, butyric anhydride, lauric anhydride, crotonic anhydride, phthalic anhydride, succinic anhydride, etc.

Although polymerization catalysts are not required, they may be utilized if desirable in order to speed up the reaction somewhat. Examples of suitable catalysts are hydrogen peroxide, the organic peroxides, e. g., benzoyl peroxide, phthalic peroxide, succinic peroxide and benzoyl acetic peroxide; fatty oil acid peroxides, e. g., cocoanut oil acid peroxides, stearic peroxide and oleic peroxide; alcohol peroxides, e. g., tertiary butyl peroxide and terpene oxides, e. g., ascaridole, etc. The very active polymerization catalysts such as boron trifluoride, aluminum chloride, stannic chloride, etc., are quite active with respect to the polymerization of isopropenyl toluene but they are not particularly suitable for use with my mixtures since they tend to polymerize the isopropenyl toluene but have little effect on the acrylonitrile.

Suitable plasticizers may be incorporated into my polymeric materials in order to produce products of varying degrees of flexibility even to the extent of producing rubbery materials. Particularly suitable plasticizers for my resinous materials are dibenzyl ether, dibutyl phthalate, benzyl phenyl amino acetonitrile, the naphthyl alpha-hydroxy isobutyric acid, esters such as the alpha-naphthyl methyl ester, other esters of alpha-hydroxy isobutyric acid, chlorinated rubber, ethyl lactate, tricresyl phosphate, etc.

It is preferable that the ratio of acrylonitrile to isopropenyl toluene be between about 1:3 and 1:1 and within this range the optimum concentration is in the neighborhood of 28–35 parts of acrylonitrile to 72–65 parts of isopropenyl toluene. My invention is not limited to the foregoing range since very small proportions of acrylonitrile activate and react with isopropenyl toluene to produce resinous materials much more easily than, and with different properties from, isopropenyl toluene alone. Acrylonitrile polymers have a very high softening point but this may be lowered approximately by even small quantities of isopropenyl toluene, e. g., 1 part of the latter to 9 parts of the former. Hence in its broadest aspect my invention covers the use of all effective proportions of acrylonitrile and isopropenyl toluene.

Moreover, depending on the ratio of ingredients, various polymers may be prepared, two factors being operative to obtain a resinous product of definite flow character, viscosity, etc., and these are (1) the ratios used, and (2) the length of the polymer, i. e., the molecular weight. For most injection molding purposes the flow of the plastic has to be high. For resins of high melting point, particularly for compression molding, the melting point may be high and degree of flow rather low. Such compositions may contain up to 75% of combined acrylonitrile.

If acrylonitrile and isoprenyl toluene be polymerized when dispersed in water as in Examples 3–6, it may be desirable to start the reaction with at ratio of about 35 parts of acrylonitrile to 65 parts of isopropenyl toluene. After the polymerization reaction starts, i. e., after polymerized nuclei are formed, the isopropenyl toluene polymerizes very rapidly. The reaction may be stopped empirically according to analysis or other convenient means and the uncombined acrylonitrile may be recovered from the residue by steam distillation. For producing resins suitable for injection molding it is advantageous to have about 28% of the product combined acrylonitrile. To form clear polymers which do not contain any colloidal haze the proportion of acrylonitrile should be less than 35% of the final product.

The softening point of my resinous products varies with the composition, but within the preferred range set forth above, the flow point (A. S. T. M.) is generally between about 120 and 140° C. If the ratio of acrylonitrile to isopropenyl toluene be about 1:2, the product will have a medium high molecular weight whereas products wherein the ratio is about 1:4 to 1:3 have quite high molecular weight.

The crude isopropenyl toluene which may be employed if perfectly light-colored products are not required, contains about 90–100% of isopropenyl toluene together with hydrocarbon impurities and possible traces of formaldehyde which results from oxidation of the hydrocarbon. If very high grade products be desired, the color from the crude isopropenyl toluene may be removed by treating it with a 5–10% solution of an alkali such as sodium hydroxide followed by a steam distillation over alkaline water. A fairly pure material may also be obtained by steam distillation without the alkali treatment. To obtain high concentrations of isopropenyl toluene, rectification is necessary.

Acrylonitrile often contains small amounts of amine impurities. Acrylonitrile may be purified by washing with acidic materials followed by distillation. This produces a very high grade material but there is some danger of the acrylonitrile gelling during the distillation. I have found that it is generally sufficient to pass acrylonitrile through bauxite until the material coming through contains materials which will react with phosphoric acid. The bauxite is then reactivated or a new bed of bauxite used to treat further acrylonitrile.

It is to be noted that the purity of the raw materials influences the speed of the reaction, the extent of polymerization, the molecular weight of the product as well as the strength of the final resin. The speed of the polymerization, however, is more of a function of the ratios of ingredients.

For some purposes part or all of the isopropenyl toluene used according to my invention may be substituted with isopropenyl benzene, isopropenyl xylene, isopropenyl cyanide, isopropenyl amides, etc.

Isopropenyl toluene may be polymerized either in the presence or absence of acrylonitrile with various unsaturated compounds including the following: acrylic acid and its esters (e. g., methyl acrylate, butyl acrylate, etc.), styrene, methacrylic acid and its esters (e. g., methyl methacrylate, butyl methacrylate, etc.), the maleic esters (e. g., diethyl maleate, diallyl maleate, etc.), the glycol maleates, acrolein and methacrolein, etc. Products prepared from the latter two materials may be alkylated with suitable alcohols in the presence of acids. Some unsaturated materials are not suitable for use according to my invention, e. g., itaconic acid esters, vinyl acetate and the like. Methacrylonitrile and methyl isopropenyl ketone may be utilized only to a limited extent.

My polymerization reactions may be carried out in any suitable solvent in which the polymer is soluble, other than ethylene dichloride, e. g., acetone, cyclohexanone, propylene dichloride, carbon tetrachloride, dichlor ethyl ether, etc.

When I polymerize isopropenyl toluene with acrylonitrile emulsified in water relatively strong emulsifying agents are generally desirable. Any compatible emulsifier which will produce a satisfactory emulsion may be used and may be selected from the following types: diamyl, dihexyl or dioctyl sulfosuccinic esters and salts thereof, salts of alkylated naphthalene sulfonic acids, long chain quaternary ammonium compounds, sulfonated or sulfated higher alcohols, e. g., lauryl sulfate, the salts of the sulfated or sulfonated higher alcohols, sulfonated oils, glycol oleates and linoleates, mineral oil sulfonates, aromatic sulfonates, wax acid soaps, triethanolamine soaps such as the oleate, monoglycerol linoleates, amino sulfonates and sulfates, ammoniacal or other alkaline caseins, soaps, lecithin, cholesterol, saponin, etc. When the polymerization is carried out in emulsion the polymer usually is formed as a latex.

Suitable dispersing agents having use in accordance with the procedure typified by Examples 4-6 include not only polyvinyl alcohol and methyl cellulose but also various colloidal materials such as gum arabic, gelatin, the hydroxy ethyl ether of cellulose, salts of polymeric organic acids, such as acrylic, hydroxy acrylic acids, polymeric water-soluble amides, etc. The low viscosity methyl cellulose suitable for practicing my invention should have a viscosity of about 25-75 centipoises in a 2% aqueous solution inasmuch as the high viscosity methyl cellulose is almost completely thrown out of solution. When the polymerization is carried out with the reactants dispersed in water the polymer usually precipitates in the form of irregular granules during the polymerization process and in some cases a small proportion of polymeric material may be left suspended in the aqueous medium. Under special conditions, spherical products result. In some instances it may be desirable to employ mixtures of emulsifying agents and dispersing agents as well as mixtures of emulsifying agents themselves or mixtures of dispersing agents themselves.

As indicated in Example 1, the isopropenyl toluene and acrylonitrile may be polymerized alone or a solvent may be added during or after the completion of the polymerization. Similarly, a non-solvent such as water may be added, together with emulsifying or dispersing agents at any stage of the reaction, and if the polymerization is not complete, it may be continued to the desired point. If the emulsions or suspensions of polymerized material be produced, they may be precipitated as indicated in the preceding examples or they may be used as such for coating purposes as in the treatment of paper, textiles, leather and other fibrous materials.

The resins suitable for casting may be cast into special shapes or into tubes, rods, sheets, etc. The tubes, rods and sheets may be sawed, cut, or machined into particular shapes. The cast products may also be cut or ground to form a molding material particularly suitable for either injection or compression molding.

Solutions of the polymeric material produced according to Example 1 for instance may be dried on rolls, ground and molded.

Solid polymers produced by any of the processes described herein may be mixed with plasticizers, for example in an internal mixer such as a Banbury mixer, sheeted on hot rolls and subsequently calendered, thereby producing sheets of clear, polymeric material.

Various pigments and dyes may be incorporated in my compositions, e. g., Sudan IV, nigrosine, etc.

If desirable, fillers may be included in my compositions, e. g., wood flour, wood fiber, paper, dust, clay, zein, glass wool, mica granite dust, silk flock, cotton flock, steel wool, carborundum, paper, cloth, sand, etc. These may be added to the starting materials or to the finished resin.

Moldings of my polymers and materials coated with my polymers are especially suitable for use in the electrical industry since they have desirable electrical properties for many purposes. Various molded novelties may be produced from my polymers such as spoons, dishes, bottle tops, receptacles of all kinds including ash trays, cigarette cases, as well as for handles, for brushes, doors, drawers, etc. My resinous materials are also suitable in the production of lamp shades, light fixture receptacles or parts thereof, etc. Sheets of my polymeric materials may be used in windows, either alone or associated with glass.

The fine granules of resin prepared from dispersions of the molecular reactants in water carry very high electrical charges when dry and therefore repel each other when they contain a light charge. Interesting novelties may be produced utilizing this property since a few small particles placed in a glass sphere will orient themselves rather evenly over the surface.

Emulsions and solutions of my polymeric materials may be employed in textile printing processes, as well as in the sizing and finishing of textiles. Paper may be treated with emulsions or solutions of my resinous materials in order to render it repellent to water, grease, etc., as well as to produce insulating materials and the like.

Obviously many modifications and variations in the processes and compositions described above may be made without departing from the spirit and scope of the invention as defined in the appended claims.

I claim:

1. A copolymer of a mixture including isopropenyl toluene and acrylonitrile.

2. A copolymer of a mixture including from 1 to 3 parts of isopropenyl toluene to about 1 part of acrylonitrile.

3. A molded article comprising a copolymer of a mixture including isopropenyl toluene and acrylonitrile.

4. A molded article comprising a copolymer of a mixture including from 1 to 3 parts of isopropenyl toluene to about 1 part of acrylonitrile.

5. A process comprising copolymerizing a mixture including isopropenyl toluene and acrylonitrile.

6. A process comprising copolymerizing a mixture including from 1 to 3 parts of isopropenyl toluene to about 1 part of acrylonitrile.

7. A process comprising copolymerizing a mixture including isopropenyl toluene and acrylonitrile, said mixture being in the form of an aqueous emulsion.

8. A process comprising copolymerizing a mixture including isopropenyl toluene and acrylonitrile, said mixture being in the form of an aqueous dispersion.

9. A process comprising copolymerizing a mixture including from 1 to 3 parts of isopropenyl toluene to about 1 part of acrylonitrile, said mixture being in the form of an aqueous dispersion containing polyvinyl alcohol as a dispersing agent.

10. A process comprising copolymerizing a mixture including from 1 to 3 parts of isopropenyl toluene to about 1 part of acrylonitrile, said mixture being in the form of an aqueous dispersion containing methyl cellulose as a dispersing agent.

EDWARD L. KROPA.

CERTIFICATE OF CORRECTION.

Patent No. 2,310,961.　　　　　　　　　　　　　　　　　February 16, 1943.

EDWARD L. KROPA.

It is hereby certified that error appears in the printed specification of the above numbered patent requiring correction as follows: Page 2, second column, line 65, for "polymerizable" read --polymerizably--; page 3, second column, line 3, for "isoprenyl" read --isopropenyl--; page 4, second column, line 22, after the word "mica" insert a comma; and that the said Letters Patent should be read with this correction therein that the same may conform to the record of the case in the Patent Office.

Signed and sealed this 13th day of April, A. D. 1943.

Henry Van Arsdale,
　　　　　　　　　　　　　　　　　　　　Acting Commissioner of Patents.

(Seal)